United States Patent [19]

McQuaid

[11] Patent Number: 5,167,267
[45] Date of Patent: Dec. 1, 1992

[54] AUTOMOBILE COVER

[76] Inventor: Everett P. McQuaid, 1757 Staley Rd., Grand Island, N.Y. 14072

[21] Appl. No.: 818,051

[22] Filed: Jan. 8, 1992

[51] Int. Cl.⁵ .............................................. B60J 11/00
[52] U.S. Cl. ..................................... 150/166; 150/154
[58] Field of Search ............... 150/154, 166, 167, 168; 206/335; 296/95.1, 136

[56] References Cited

U.S. PATENT DOCUMENTS

| | | | |
|---|---|---|---|
| 1,472,651 | 10/1923 | Holling | 150/166 |
| 2,243,981 | 6/1941 | Rowan | 296/136 |
| 2,646,097 | 7/1953 | Gaverth et al. | 150/166 |
| 2,733,747 | 2/1956 | Altschul | 150/166 |
| 2,787,311 | 4/1957 | Cohen et al. | 150/166 |
| 3,202,193 | 8/1965 | Ware | 150/154 |
| 3,316,012 | 4/1967 | Thier | 150/166 |
| 4,827,997 | 5/1989 | Rolan | 150/166 |
| 5,012,760 | 5/1991 | George, Jr. | 150/166 |
| 5,014,758 | 5/1991 | Stinson | 150/168 |

FOREIGN PATENT DOCUMENTS 861512 1/1953 Fed. Rep. of Germany ...... 150/166

Primary Examiner—Gary E. Elkins
Attorney, Agent, or Firm—Wallace F. Neyerlin

[57] ABSTRACT

A cover for a vehicle (such as a motor vehicle) is disclosed. The cover is comprised of a multiplicity of panels, at least two of which have different colors. These differently colored panels assist the user of the cover in orienting the cover upon the vehicle to be covered.

26 Claims, 2 Drawing Sheets

AUTOMOBILE COVER

FIELD OF THE INVENTION

A cover for a motor vehicle (such as an automobile, a truck, a boat or a camper) which is fabricated of color-coded panels to facilitate its positioning upon the motor vehicle in the proper manner.

BACKGROUND OF THE INVENTION

Covers for motor vehicles (such as automobiles, trucks, boats, campers and the like) are well known to those skilled in the art. These covers are usually large and bulky. They often contain a top panel, a front panel, a back panel, and side panels. Many of these motor vehicles covers are asymmetrical, that is, the front panels thereof may differ in size or shape from the back panels; they are adapted to cover vehicles which often area also asymmetrical. However, when such covers area being applied to the motor vehicle, it often is difficult to determine which end of the cover should go over the front part of the motor vehicle, and which should go over the rear portion of the car.

It is an object of this invention to provide a cover for a motor vehicle which will give its user visual cues as to how it should be oriented on the motor vehicle to facilitate putting it on the vehicle.

It is another object of this invention to provide a vehicle cover whose manufacturing cost will be substantially equal to or only slightly greater than the cost of manufacturing prior art vehicle covers.

SUMMARY OF THE INVENTION

In accordance with this invention, there is provided a cover for a motor vehicle. The cover is comprised of a multiplicity of panels, at least two of which have different colors. The differently colored panels assist the user of the cover in orienting the cover upon the vehicle to be covered.

BRIEF DESCRIPTION OF THE DRAWINGS

The present invention will be more fully understood by reference to the following detailed description thereof, when read in conjuntion with the attached drawings, wherein like reference numerals refer to like elements, and wherein.

DESCRIPTION OF THE PREFERRED EMBODIMENTS

Figure 1:
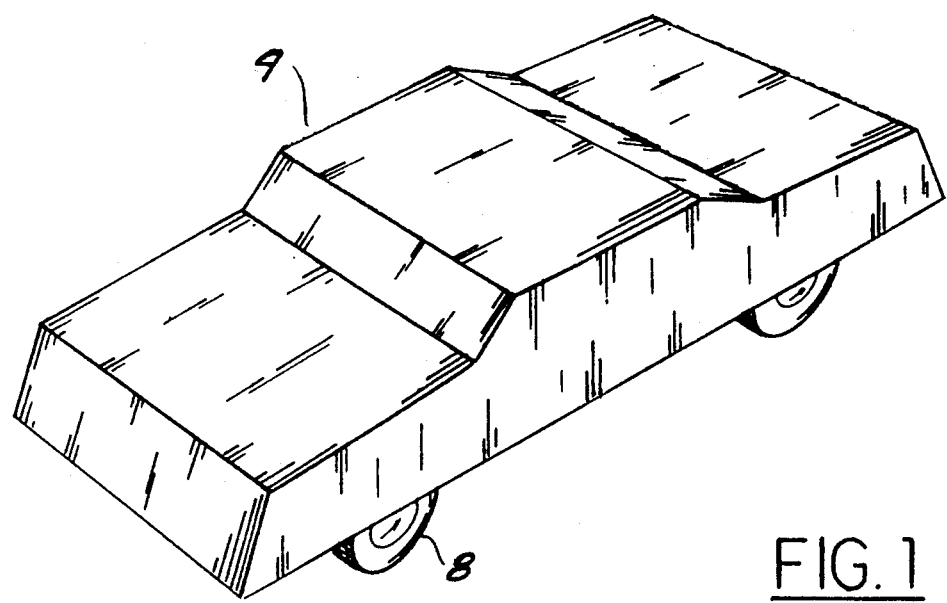
FIG. 1 is a perspective view of a prior art automobile cover disposed on an automobile.

The automobile cover 10 of this invention preferably is comprised of a flexible sheet of material which is comprised of or may consist of material used in prior art automobile covers. Thus, by way of illustration and not limitation, the automobile cover 10 may comprise or consist of a weather-resistant fabric or plastic (see U.S. Pat. No. 3,316,012), cloth or plastic (see U.S. Pat. No. 4,972,892), vinyl, leather, nylon, plastic, synthetic material, or combinations thereof (see U.S. Pat. No. 4,889,171), Mylar or polyethylene (see U.S. Pat. No. 4,821,785), or plastic, such as a poly methane foam, laminated to an exterior surface material, such as polyvinyl chloride, as taught in U.S. Pat. No. 4,041,999. The description of each of these prior art patents is hereby incorporated by reference into this specification.

In one preferred embodiment, the material in the vehicle cover is constructed from "EVOLUTION 3," which is a polypropylene fabric. A quilted, four-layer, water-resistant car cover made from "EVOLUTION 3" is sold under the name of "TECHNALON" by Avalon Bay Automotive Accessories, of 118.5 South La-Brea Avenue, Los Angeles, Calif. This company also sells car covers comprised of flannel, with a 100 percent brushed cotton lining on the inside.

In another preferred embodiment, the material in the vehicle cover is constructed from a soft cotton fabric. By way of illustration, such a cover is sold by the California Car Company ( of 15430 Cabrito Road, Van Nuys, Calif.) as "SOFTWEAVE". This company also sells a flannel-lined 100 percent soft cotton cover under the name of "PLUSHWEAVE."

In another preferred embodiment, the vehicle cover is made from a polyester-cotton blend. In yet another embodiment, the vehicle cover consists essentially of nylon fabric.

The automobile cover 10 of this invention may be constructed in a manner similar to that described in the prior art.

By way of illustration, and as is disclosed in U. S. Pat. No. 4,972,892, automobile cover 10 may be fabricated from flexible material (such as cloth or plastic sheet) in several separate panels which are sewn together. One of such separate panels may have a substantially rectangular shape adapted to cover the surface area of a car's roof. Others of said panels may be front and rear sections which, after being joined to the roof section, extend respectively from the front and rear boundaries of the roof section and conform substantially to the front and rear areas of the car. Side panels of the cover extend respectively from the opposite boundaries of the roof section and conform substantially to the side areas of the vehicle. The disclosure of U.S. Pat. No. 4,972,892 is hereby incorporated by reference into this specification.

By way of further illustration, and as is disclosed in U.S. Pat. No, 4,938,522, the automobile cover 10 may be comprised of flared side panels, a bumper panel, hood panels, a windshield panel, a roof panel, a rear window panel, and a tail panel, all of which are connected together by seams and closely fit the corresponding surface of the automobile. The cover has flaps in one side panel, especially on the driver's side, which can be opened to permit access to the car. The disclosure of U.S. Pat. No. 4,938,522 is hereby incorporated by reference into this specification.

By way of further illustration, and as is disclosed in U. S. Pat. No. 4,827,997 (the disclosure of which is hereby incorporated by reference into this specification), the automobile cover 10 may be comprised of a plurality of panels of lightweight impermeable sheet material having their edges joined to form an enclosure. In this embodiment, the sheet material is preferably a laminate of reflective metal between an outer layer of transparent resin (such as Mylar or polyethylene) and an inner layer of resin.

By way of further illustration, the automobile cover 10 may comprise one or more of the structural or composition features of the covers disclosed in U.S. Pat.

Nos. 4,863,210; 4,699,192; 4,612,967; 4,596,418; 4,589,459; 4,531,560; 3,910,330; 3,763,908; 3,316,012; 2,994,356 and 2,712,845.

The vehicle cover 10 of this invention may be used to cover any vehicle. As used in this specification, the term "vehicle" includes any means of transport by land, sea, or air such as, e.g., boats, automobiles, trucks, campers, trailers, airplanes, and the like. It is preferred that the vehicle cover be used on a motorized vehicle.

FIG. 1 illustrates a typical prior art vehicle cover 9. As will be appreciated by reference to FIG. 1, when cover 9 is not mounted on vehicle 8, it is often difficult for one to determine which part of the cover corresponds to the front or the rear of the vehicle. Thus, one has to engage in a cumbersome process of trial and error to properly orient cover 9 on vehicle 8.

Figure 2:
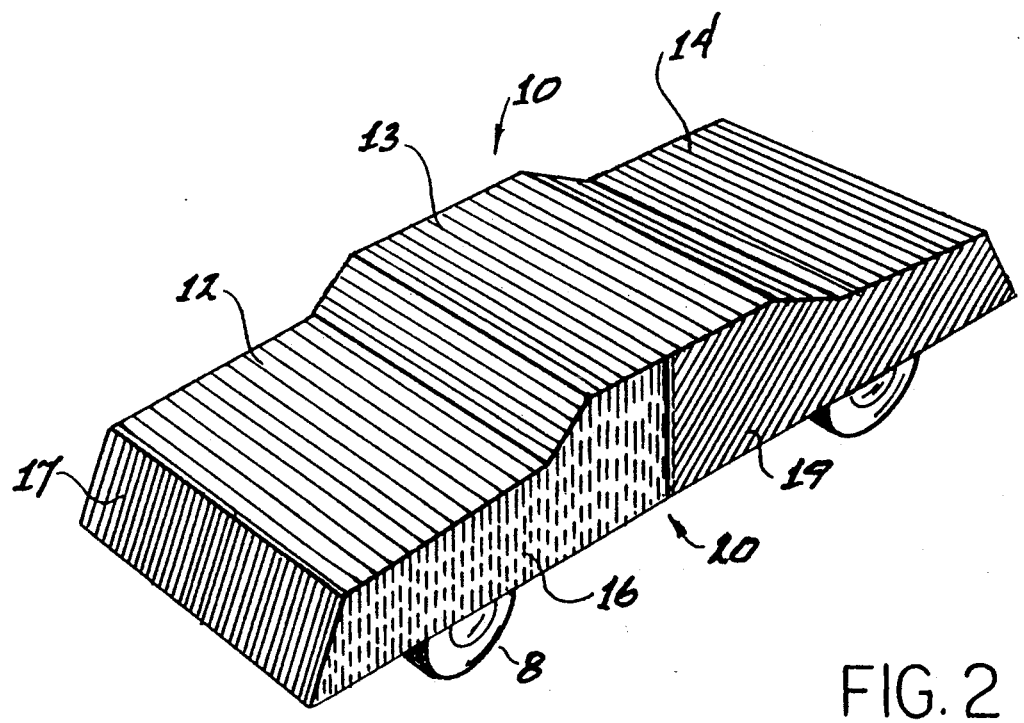
FIG. 2 is a perspective view of a preferred embodiment of the automobile cover of this invention disposed on an automobile.

FIG. 2, by comparison, illustrates one preferred embodiment of the vehicle cover 10 of this invention. Referring to this illustrative embodiment, it will be seen that hood portion 12 has a different appearance than trunk portion 14. Similarly, the front portion 16 of the driver's side of the cover 10 has a different appearance than the rear portion 18 of the driver's side of the cover 10.

The different appearances of the various sections of cover 10 assist a user, when the cover is not disposed on the vehicle 8, in determining how to orient said cover and amount it onto the vehicle. Thus, for example, when front portion 16 has a light red color and rear portion 18 has a dark red color, these color cues will indicate to a user the proper orientation of the cover as it is to be mounted on the vehicle 9.

It is essential that at least two different sections of the cover 10 have different appearances so that they may provide suitable cues to the user as to how they should be oriented. The different appearances of these sections may be created by the use of sections with different colors and/or different materials and/or different fabric constructions and/or other means of providing visual cues to the user.

In one preferred embodiment, hood portion 12, roof portion 13, and trunk portion 14 all have a similar appearance. In another preferred embodiment, hood portion 12, roof portion 13, trunk portion 14, and grill portion 17 all have a similar appearance. In yet another preferred embodiment, hood portion 12, roof portion 13, trunk portion 14, grill portion 17, and tail portion 18 (not shown in FIG. 2, but see FIGS. 3 and 4) all have a similar appearance. It is preferred that, in each of these embodiments, the left side panel 20 of cover 10 has an appearance which is different from the right side panel 22 (not shown in FIG. 2, but see FIGS. 3 and 4).

Many other embodiments will be apparent to those skilled in the art. Thus, by way of illustration and not limitation, when cover 10 is comprised of a multilayer material, the inside of a cover 10 may have a different appearance than its outside. Thus, for example, grill portion 17 may have a different appearance than tail portion 18 to indicate the front and back of cover 10. By way of further illustration, cover 10 may include a zipper to provide access to the interior of the vehicle. By way of yet further illustration, each side panel of cover 10 may be a different color, with the forward and rear portions of the side panel being a lighter or darker shade of the same color. Futhermore, various color combinations of the top or the side panels may be used to indicate different applications (such as, e.g., white for a large-sized cover and yellow for a smaller-sized cover).

Figure 3:
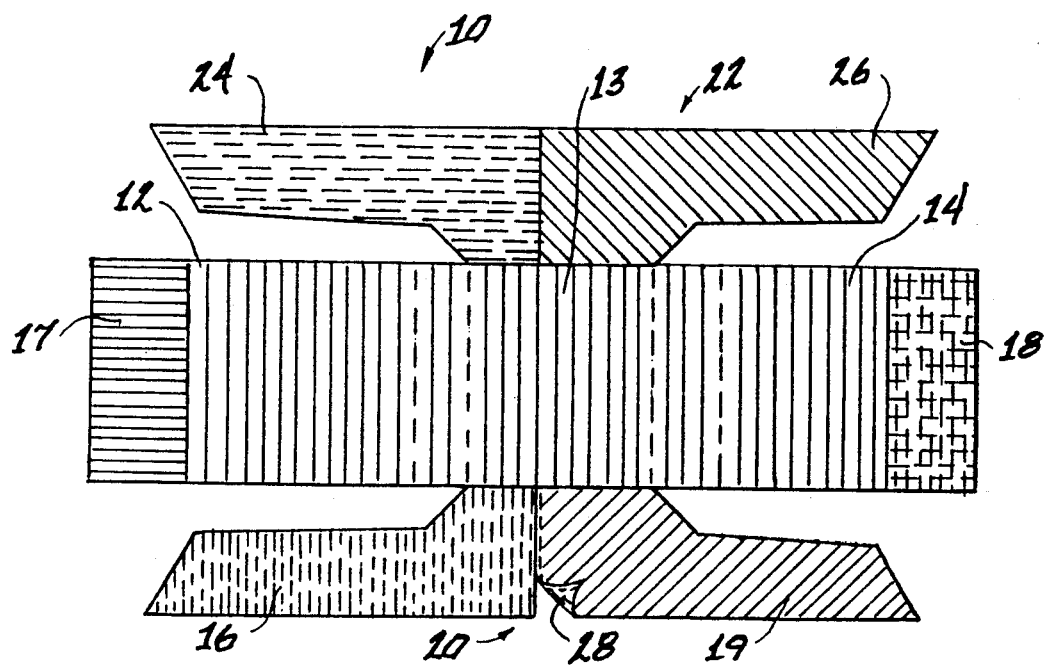
FIG. 3 is a top view of the automobile cover of FIG. 2.
Figure 4:
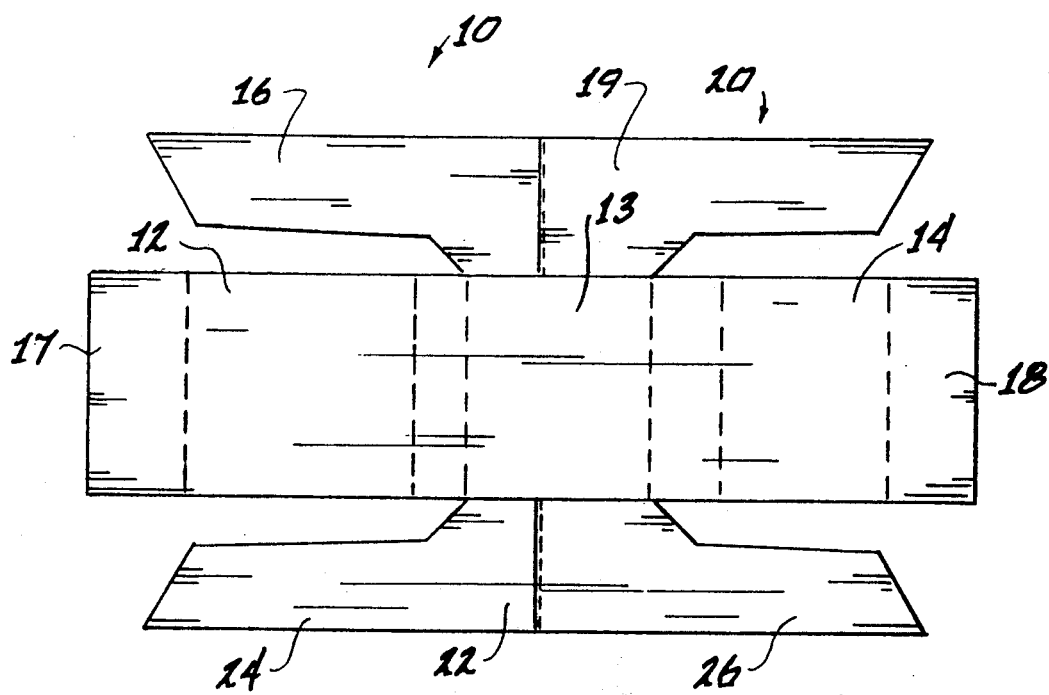
FIG. 4 is a bottom view of the automobile cover of FIG. 2.

FIGS. 3 and 4 illustrate another preferred embodiment of applicant's invention in which the appearance of the exterior surface of cover 10 differs from the appearance of the interior surface of cover 10. Thus, in this embodiment, one may tell which side of the cover is its inside, and which is its outside.

Referring to FIG. 3, and in the embodiment depicted therein, the outside surface of grill panel 17 has a different appearance than the outside surface of tail panel 18, preferably having a different color. In one aspect of this embodiment, illustrated in FIG. 4, the inside surfaces of grill panel 17 and tail panel 18 have the same appearance. In this aspect, the entire inside surface preferably has the same color.

Referring again to FIG. 3, it will be seen that the left panel 20 has a different appearance (and preferably a different color) than right panel 22 of cover 10. In the aspect of this embodiment illustrated in FIG. 3, front portion 16 and rear portion 19 of left panel 20 are different shades of the same color or different colors; similarly, in this aspect, front portion 24 and rear portion 26 of right panel 22 are either different shades of the same color or different colors. In another embodiment, not shown, portions 16 and 19 of left panel 20 have substantially the same appearance, and portions 24 and 26 of right panel 22 have substantially the same appearance.

Referring again to FIGS. 3 and 4, it will be seen that, in the embodiment depicted therein, cover 10 is comprised of an openable flap 28 which may be opened and closed by conventional means such as, e.g., a zipper. Means for providing such an openable and closable flap are well known to those skilled in the art and are described, for example, in U.S. Pat. No. 4,938,522, the disclosure of which is hereby incorporated by reference into this specification.

The following example is presented to illustrate the claimed invention but is not to be deemed limitative thereof.

EXAMPLE

In substantial accordance with the FIGS. 2, 3, and 4, a vehicle cover was constructed from cotton. The cover produced was a single-layer, integral structure, with side panels 20 and 22 being integrally joined to grill panel 17, hood panel 12, roof panel 13, trunk panel 14, and tail panel 18.

Side panel 20 was a red color, and side panel 22 was a green color. Thus, by reference to these colors, a user could determine which sides of the panel were its right and left sides and, thus, which portion of the cover went in front, and which went in the rear.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A lightweight, protective cover for a motorized vehicle, wherein said cover is comprised of a top panel, a left side panel, and a right side panel, joined to each other to form said cover, and wherein said left side panel has a different color than said right side panel as a means for orienting the cover when putting it over the motorized vehicle to protect it.

2. The cover as recited in claim 1, wherein said left side panel is constructed of a front section and a rear section.

3. The cover as recited in claim 1, wherein said right side panel is constructed of a front section and a rear section.

4. The cover as recited in claim 2, wherein each of said front section and said rear section of said left side panel are different shades of the same color.

5. The cover as recited in claim 3, wherein each of said front section and said rear section of said right side panel are different shades of the same color.

6. The cover as recited in claim 2, wherein each of said front section and said rear section of said left side panel are different colors.

7. The cover as recited in claim 3, wherein each of said front section and said rear section of said right side panel are different colors.

8. The cover as recited in claim 1, wherein said cover is comprised of at least two layers of material and comprises an interior surface and an exterior surface.

9. The cover as recited in claim 8, wherein said exterior surface has a different appearance than said interior surface.

10. The cover as recited in claim 8, wherein said exterior surface has a different color than said interior surface.

11. A lightweight, protective cover for a motorized vehicle, wherein said cover is comprised of a top panel, a left side panel, a right side panel, a bumper panel, a windshield panel, a rear window panel and a trunk panel, joined to each other by seams to form said cover, and wherein said left side panel has a different color than said right side panel as a means for orienting the cover when putting it over the motorized vehicle to protect it.

12. A lightweight protective cover for a motorized vehicle, wherein said cover is comprised of a top panel, a left side panel, a right side panel, a bumper panel, a windshield panel, a rear window panel and a trunk panel, joined to each other by seams to form said cover, and wherein said left side panel has a different appearance than said right side panel.

13. The cover as recited in claim 12, wherein each of said left side panel, said right side panel, said bumper panel, said windshield panel, said top panel, said rear window panel and said trunk panel are each connected together by sewn seams.

14. The cover as recited in claim 12, wherein each of said left side panel, said right side panel, said windshield panel, said bumper panel, said top panel, said rear window panel, and said trunk panel are each connected together by heat-sealed seams.

15. The cover as recited in claim 12, wherein said left side panel has a different color than said right side panel.

16. The cover as recited in claim 15, wherein said left side panel is constructed of a front section and a rear section.

17. The cover as recited in claim 15, wherein said right side panel is constructed of a front section and a rear section.

18. The cover as recited in claim 16, wherein each of said front section and said rear section of said left side panel are different shades of the same color.

19. The cover as recited in claim 17, wherein each of said front section and said rear section of said right side panel are different shades of the same color.

20. The cover as recited in claim 16, wherein each of said front section and said rear section of said left side panel are different colors.

21. The cover as recited in claim 17, wherein each of said front section and said rear section of said right side panel are different colors.

22. The cover as recited in claim 13, wherein said cover is comprised of at least two layers of material and comprises an interior surface and an exterior surface.

23. The cover as recited in claim 22, wherein said exterior surface has a different appearance than said interior surface.

24. The cover as recited in claim 22, wherein said exterior surface has a different color than said interior surface.

25. The cover as recited in claim 13, wherein said cover is comprised of an openable access flap.

26. The cover as recited in claim 25, wherein said openable access plap is comprised of a zipper.

* * * * *